Feb. 23, 1932.　　A. J. MUSSELMAN　　1,846,269
METHOD OF MAKING TIRES
Filed July 2, 1927　　2 Sheets-Sheet 1
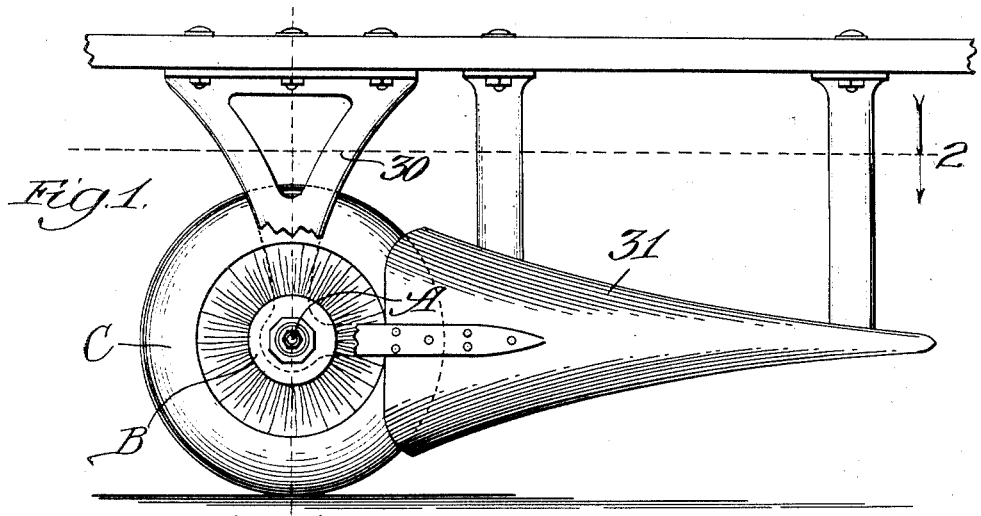
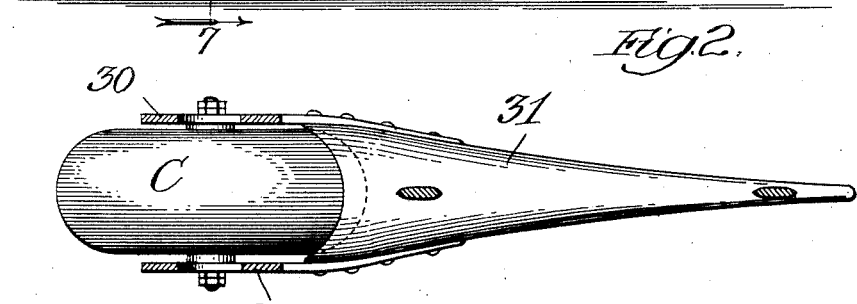
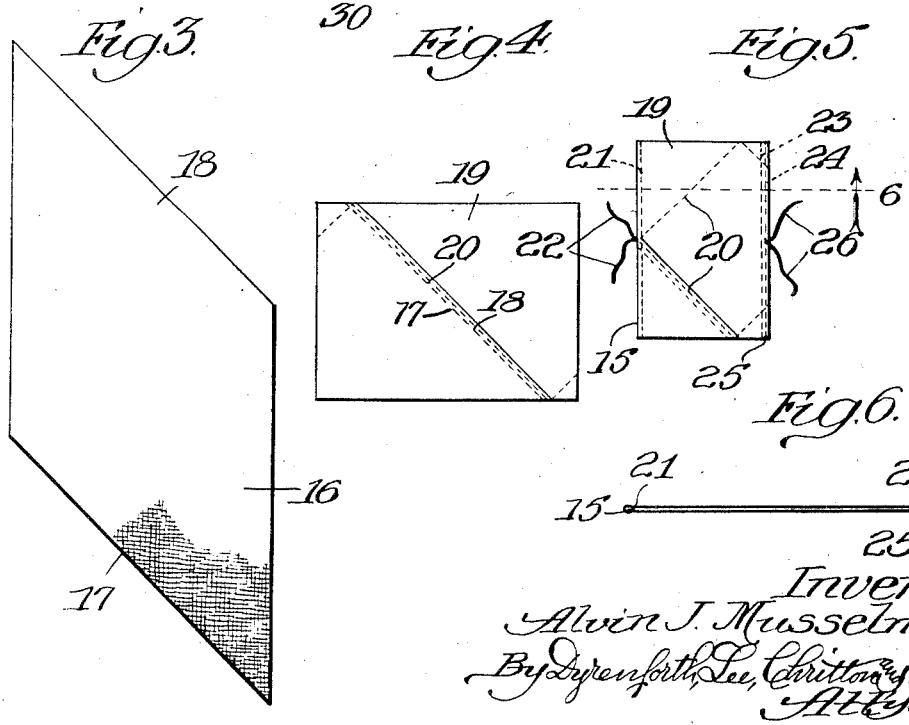

Feb. 23, 1932.  A. J. MUSSELMAN  1,846,269
METHOD OF MAKING TIRES
Filed July 2, 1927  2 Sheets-Sheet 2
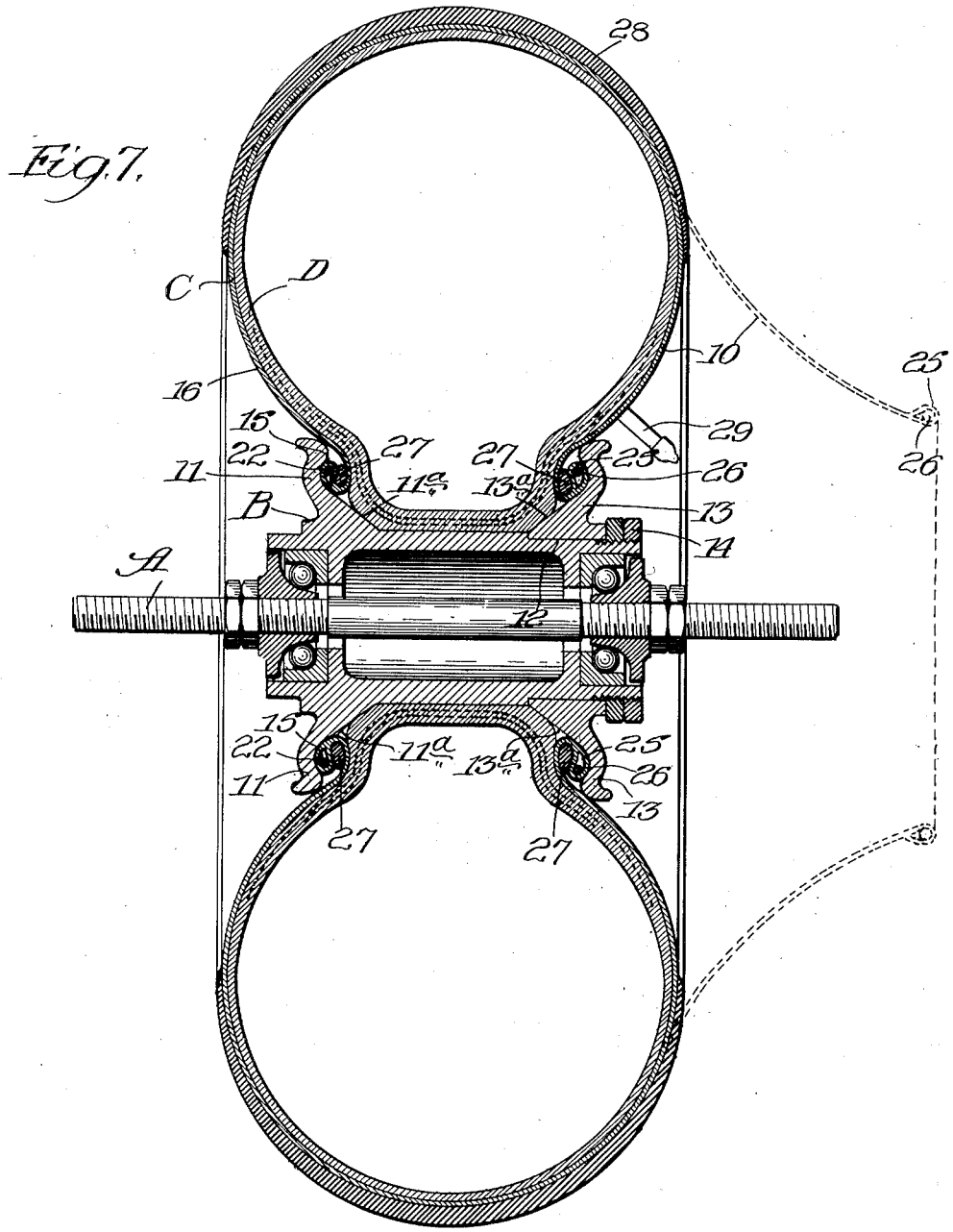

Patented Feb. 23, 1932

1,846,269

UNITED STATES PATENT OFFICE

ALVIN J. MUSSELMAN, OF CHICAGO, ILLINOIS, ASSIGNOR TO THE GOODYEAR TIRE & RUBBER COMPANY, OF AKRON, OHIO, A CORPORATION OF OHIO

METHOD OF MAKING TIRES

Application filed July 2, 1927. Serial No. 203,107.

This invention relates particularly to a balloon tire and wheel, and method of manufacturing same, which wheel is especially adapted to be used on airplanes. The invention may find other uses, however.

An object of the invention is to provide a tire which will give a very much greater cushioning effect than those heretofore used so that an airplane may land on a very rough surface without undue strain on its frame.

This and other objects as will hereinafter appear, are accomplished by this invention which is fully described in the following specification and shown in the accompanying drawings, in which:

Figure 1 is a side elevation of an airplane wheel embodying the invention;

Fig. 2 is a partial horizontal section on the line 2 of Fig. 1;

Fig. 3 is a developed view of the fabric which is used in making the tire;

Fig. 4 is a front elevation of the fabric of Fig. 3 rolled into a tubular form and stitched;

Fig. 5 is a similar view of the same with the ends turned in;

Fig. 6 is an enlarged section on the line 6 of Fig. 5; and

Fig. 7 is an enlarged section on the line 7 of Fig. 1.

The embodiment illustrated comprises an airplane wheel and tire consisting of an axle A, a flanged hub B which is journalled thereon, a casing C and an inner tube D.

The casing C is made up of a flexible fabric and one mode of building the same will be described hereinafter. One feature of this invention is that one or both sides 10 of the casing is made "full" so that when released it can be swung out to the dotted line position shown in Fig. 7 or even further if desired so that the inner tube can readily be withdrawn through this large opening.

The hub B is provided at one side with a flange 11 while the other end is reduced at 12 to receive a flanged collar 13 which is secured thereon by means of nuts 14 or the like. The flanges 11 and 13 serve to retain the headings 15 on the inner edges of the casing C.

The casing is preferably made as shown in Figs. 3 to 6, from a single piece 16 of cotton fabric which is cut with the weave as shown in Fig. 3. When the two bias edges 17 and 18 are brought together and sewed the whole forms the tube 19, with a diagonal seam 20, the whole being flattened as shown in Fig. 4. The left hand end of the tube is then turned inwardly and drawn through until the two right hand ends are in line as shown in Fig. 5. This tube is then sewed circumferentially with a line of stitching on the line 21 of Figs. 5 and 6 thereby forming a looped end or heading 15 which is adapted to receive a cord or the like 22, the ends of the cord passing out through an opening in the seam 20 at this point.

Two parallel lines of stitching 23 and 24 at the right hand edge provide a similar heading 25 through which a cord 26 may be passed in a similar manner.

This fabric is then placed over a suitable form (not shown), the edges having the headings 15 and 25 then being forced inwardly so that the whole assumes the position shown in Fig. 7, in which the annular cords or members 22 and 26 draw the headings 15 and 25 down and retain them behind the flanges 11 and 13.

The headings 15 and 25 are passed through metal rings 27 so that the headings are compressed between the rings and the flanges 11 and 12, when pressure is exerted from within as the tire is inflated. The inner surfaces 11ª and 13ª are tapered inwardly so that a wedging action also takes place which grips the inner edge of the casing between the rings 27 and these tapered surfaces.

The fabric 16 may be of any suitable strong pliable material, such as cotton or silk, preferably impregnated with water-proofing material, such as rubber. Preferably a suitable tread 28 is applied to the casing C. The tread may be reinforced, if desired, by means of fabric (not shown). The tread may be vulcanized to the casing fabric, if desired.

In Fig. 7, it is to be understood that the casing C (including side-walls 10) is composed of two plies. In practice, any desired number of plies may be employed. It is preferable to employ a plurality of very thin flexible plies, rather than a heavier single ply.

A valve and valve stem 29 projects through a suitable opening in the side of the casing C and this provides a means for readily filling the tire with air.

When it is desired to remove this tire the nuts 14 and flange 13 are removed thereby exposing the cord 26 which has been previously drawn and the ends tied or otherwise secured together. This cord is then unfastened permitting the side wall 10 to be drawn outwardly from the full line position to the dotted line position of Fig. 7. The inner tube D can then be readily removed through this opening.

If desired, however, the entire casing C and tube D may be removed bodily from the hub B after the flange 13 has been removed. The tube can be withdrawn from the casing through the center as in the ordinary automobile tire without unfastening either of the tensioning members 22 and 26.

In Fig. 1, the tire is shown mounted on a bracket 30 which is part of the frame (or chassis-frame) of an airplane. In order to reduce as far as possible the air resistance of this wheel and tire when it is made of considerable size, I have provided a tail piece 31 which lies immediately behind the wheel and is secured to the frame by suitable braces.

This tire is intended primarily for use on airplanes and for this reason a very large soft tire is provided and one which has a very thin side wall and is intended to carry only a small air pressure. The thickness and strength of this side wall will depend upon the particular pressure which is necessary to carry in the tire and may be varied somewhat as circumstances require.

Thus it will be seen that I have provided a tire which is very light and soft and at the same time very strong so that in landing the tire will spread out over a very large area so as to provide a very great cushioning effect, at the same time adapting itself to the contour of the ground with which it comes in contact. At the same time a tire is provided with a draw string or the like which enables the side wall of the tire to be opened out so as to facilitate the insertion or withdrawal of the inner tube from the casing.

The wheel illustrated comprises a hub barrel equipped with tire-retaining flanges, and a balloon tire mounted directly on the hub-barrel. Thus a wheel-rim separated from the hub by a space, and spokes, or disks, intervening between such rim and the hub are not required. The wheel-diameter is thus mainly made up by the casing itself. In this illustration given, the wheel-diameter (tire-diameter) is more than six times the hub-diameter. This feature of substituting tire-fabric for spokes or disks and outer rim enables a very large casing-diameter (section at one side of hub) relative to the tire-diameter (wheel as a whole) to be employed.

Refering to Fig. 5, it is to be understood that this view illustrates the casing after the sleeve 19 has had one end-portion telescoped within the other end-portion and the lines of stitches have been made to provide the lateral loops which are to receive the cords. Thus, the casing, in the ilustration given, is a two-ply casing initially of cylindrical form and of very pliable material (without substantial stiffness or resilience); and, hence, the casing which is very limp is capable of having its edge-portions shirred, or puckered, by means of annular cords, or rings, of relatively small diameter. When inflation occurs, the casing assumes a circular cross-section, except at the portion where the casing is secured to the hub. Under inflation, the casing (disregarding the tread) assumes a true circular cross-section throughout all except the portion which is mounted on the hub, and presents a smooth outer surface at all points outside a transverse diametral line through the section. The inner portions of the side-walls of the casing are necessarily gathered, or puckered, however, somewhat as indicated by the radial lines on Fig. 1. Thus, the cloth is bunched, or shirred, throughout the zones which are embraced by the retaining-flanges.

It may be remarked with reference to Fig. 7 that when the gathering string, or ring, is released, the annular flap which forms the side-wall of the casing may be opened beyond the degree indicated by the dotted lines. It may, in fact, be opened so as to form practically a cylindrical extension tangential to the tread-portion of the inner tube.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. A method of making tires which comprises forming flexible material into an endless band, looping the edge portions of the band, and gathering the looped edge portions of the band in shirred relation and into circular shape of less circumference than the circumference of the original band.

2. A method of making tires which comprises forming flexible material into an endless band, looping the edge portions of the band, applying a tread band circumferentially of said endless band, and gathering the edge portions of the endless band in shirred relation and into circular shape of less circumference than the circumference of the original band.

3. A method of making a tire wheel which comprises forming flexible material into an endless band, looping the edge portions of the band, gathering the edge portions of the band in shirred relation and into circular shape of less circumference than the circumference of the original band, and securing the gathered edge portions about a central support.

4. A method of making a tire wheel which comprises forming fabric material into an endless band, inserting an inner tube therein, mounting the band and tube upon an axial support, drawing the edge portions of the band in shirred relation inwardly about the support and about the inner tube, securing the shirred edge portions to the central support, and inflating the tube.

5. A method of making tires which comprises shaping flexible material into an endless band, applying tensile members to the edge portions of the band, and confining the edge portions of the band in shirred relation upon said tensile members and about a relatively small circumference.

6. A method of making tires which comprises shaping a strip of material into an endless band of multi-ply thickness, inserting substantially inextensible members through the material at the edge portions of the band circumferentially thereof, and drawing said edge portions in shirred relation upon said members about a relatively small circumference.

7. method of making tires which comprises shaping a strip of material into an endless band, folding the material along a line circumferentially of the band to form a band of multi-ply thickness, and then inserting substantially inextensible members through the material at the edge portions of the band circumferentially thereof.

8. A method of making tires which comprises shaping a strip of flexible material into a susbtantially cylindrical band, folding the axial end portions of the band in telescoping relation until the edge portions thereof meet, thereby reducing the axial length of the band, applying tensile members to the edge portions of the reduced band, and drawing the tensile members together with the edge portions about a support of materially less diameter than the diameter of the cylindrical band.

9. A method of making a tire wheel which comprises cutting each end of a strip of material on a bias, joining the bias cut ends of the strip to form an endless band, folding the band circumferentially to reduce the axial length thereof until the edge portions of the band meet, securing such edge portions together, securing flexible members adjacent the extremities of the reduced band, and securing the flexible members, together with the edge portions, about a central support of less circumference than the circumference of the original band.

10. A method of making a tire wheel which comprises cutting each end of a strip of flexible material on a bias, joining the ends of the strip to form an endless cylindrical band, folding the band circumferentially transversely of the bias-cut joined edges to reduce the axial length of the band until the edge portions thereof meet, applying flexible members between the folded portions of the reduced band adjacent the extremities thereof, stitching portions of the band adjacent said extremities to form loops for receiving the flexible members, and securing the flexible members and said extremities of the band about a central support of less diameter than the diameter of the original band.

11. A method of making a tire wheel which comprises forming flexible material into an endless band, folding the band circumferentially to reduce the axial length thereof, applying flexible members at the edge portions of the reduced band, inserting an inner tube centrally within the band, securing the edge portions of the band by means of the flexible members about a cylindrical bearing member, and mounting the cylindrical bearing member upon an axial bearing support.

12. A method of making tires which comprises forming flexible rubberized fabric into an endless band, looping the edge portions of the band, gathering the looped edge portions of the band in shirred relation into circular configuration of less circumference than the circumference of the original band, and subjecting the assembled rubberized material to vulcanization.

13. A method of making tires which comprises forming rubberized tire-building material into an endless band, looping the edge portions of the band, applying a rubber tread circumferentially of the endless band, gathering the edge portions of the endless band in shirred relation into a circular configuration of less circumference than the circumference of the original band, and subjecting the rubberized tire-building material and tread to vulcanization.

14. A method of making tires which comprises shaping rubberized fabric material into an endless band of multi-ply thickness, securing bead elements at the edge portions of the band circumferentially thereof, applying a rubber tread band to the fabric material, gathering said edge portions in shirred relation about said bead elements about a relatively small circumference, and subjecting the tread band and rubberized fabric band to vulcanization.

In testimony whereof I have hereunto set my hand this 29th day of June, 1927.

ALVIN J. MUSSELMAN.